(12) United States Patent
Kuang et al.

(10) Patent No.: US 11,071,171 B2
(45) Date of Patent: Jul. 20, 2021

(54) PATH SWITCHING METHOD AND APPARATUS

(71) Applicant: Huawei Technologies Co., Ltd., Shenzhen (CN)

(72) Inventors: Yiru Kuang, Beijing (CN); Haibo Xu, Beijing (CN); Jian Wang, Beijing (CN); Yongbo Zeng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 16/341,733

(22) PCT Filed: Nov. 11, 2016

(86) PCT No.: PCT/CN2016/105495
§ 371 (c)(1),
(2) Date: Apr. 12, 2019

(87) PCT Pub. No.: WO2018/068358
PCT Pub. Date: Apr. 19, 2018

(65) Prior Publication Data
US 2019/0320495 A1     Oct. 17, 2019

(30) Foreign Application Priority Data
Oct. 12, 2016   (CN) .......................... 201610893348.7

(51) Int. Cl.
*H04W 76/27*   (2018.01)
*H04W 24/10*   (2009.01)
(Continued)

(52) U.S. Cl.
CPC .......... *H04W 88/04* (2013.01); *H04W 24/10* (2013.01); *H04W 56/001* (2013.01);
(Continued)

(58) Field of Classification Search
CPC ... H04W 36/0009; H04W 36/08; H04W 4/00; H04W 36/0058; H04W 76/14
See application file for complete search history.

(56) References Cited

U.S. PATENT DOCUMENTS

2013/0230032 A1* 9/2013 Lu .......................... H04W 52/16
                                                                   370/336
2013/0308598 A1   11/2013 Madan et al.
(Continued)

FOREIGN PATENT DOCUMENTS

CN        103037450 A    4/2013
CN        103188742 A    7/2013
(Continued)

OTHER PUBLICATIONS

Qualcomm Incorporated, et al., "New SI: Further Enhancements LTE Device to Device, UE to Network Relays for Wearables", 3GPP TSG RAN Meeting #71, Gothenburg, Sweden, Mar. 7-10, 2016, 7 pages.

*Primary Examiner* — Iqbal Zaidi
(74) *Attorney, Agent, or Firm* — Slater Matsil, LLP

(57) ABSTRACT

A path switching method includes: determining, by a base station, to switch a first terminal device from a first communication link to a second communication link, and sending, to the first terminal device by using a second terminal device, access information required by the first terminal device to access the base station, so that the first terminal device establishes the second communication link to the base station based on the access information. In the method, the second terminal device may release the first communication link before or after the second communication link is established, or may release the first communication link in a process of establishing the second communication link.

20 Claims, 7 Drawing Sheets

(51) Int. Cl.
  *H04W 56/00* (2009.01)
  *H04W 88/02* (2009.01)
  *H04W 88/10* (2009.01)
  *H04W 88/04* (2009.01)
  *H04W 76/30* (2018.01)
  *H04W 76/11* (2018.01)

(52) U.S. Cl.
  CPC .......... *H04W 76/11* (2018.02); *H04W 76/27* (2018.02); *H04W 76/30* (2018.02); *H04W 88/023* (2013.01); *H04W 88/10* (2013.01)

(56) References Cited

U.S. PATENT DOCUMENTS

| | | |
|---|---|---|
| 2013/0324114 A1 | 12/2013 | Raghothaman et al. |
| 2014/0160950 A1 | 6/2014 | Vasudevan et al. |
| 2015/0016358 A1* | 1/2015 | Yie ................ H04W 76/14 370/329 |
| 2016/0198339 A1 | 7/2016 | Siomina et al. |
| 2016/0198510 A1 | 7/2016 | Perets et al. |
| 2017/0086252 A1 | 3/2017 | Chai et al. |
| 2017/0303222 A1 | 10/2017 | Lee et al. |
| 2019/0320495 A1* | 10/2019 | Kuang ................ H04W 88/04 |

FOREIGN PATENT DOCUMENTS

| | | |
|---|---|---|
| CN | 103781016 A | 5/2014 |
| CN | 105657643 A | 6/2016 |
| EP | 2739087 A1 | 6/2014 |
| EP | 2903390 A1 | 8/2015 |
| WO | 2011109027 A1 | 9/2011 |
| WO | 2016064193 A1 | 4/2016 |

\* cited by examiner

PATH SWITCHING METHOD AND APPARATUS

CROSS-REFERENCE TO RELATED APPLICATIONS

This application is a national stage of International Application No. PCT/CN2016/105495, filed on Nov. 11, 2016, which claims priority to Chinese Patent Application No. 201610893348.7, filed on Oct. 12, 2016. Both of the aforementioned applications are hereby incorporated by reference in their entireties.

TECHNICAL FIELD

Embodiments of the present invention relate to communications technologies, and in particular, to a path switching method and an apparatus.

BACKGROUND

In device-to-device (Device-to-Device, D2D for short) communication, a transmit end directly sends data to a receive end, without a need to transfer the data by using a base station or through a network. A relatively special D2D communication manner is that user equipment (User Equipment, UE for short) is connected to a network by using another UE having a relay function. Generally, the former is referred to as remote UE, and the latter is referred to as relay UE (namely, relay UE).

The remote UE may not only communicate with a base station by using a D2D link (which is also referred to as a relay link or an indirect link), but also directly connect to and communicate with the base station by using a cellular link (which is also referred to as a direct link). Under different network conditions, the remote UE selects a proper communication manner. Therefore, path switching occurs. For example, the remote UE is switched from the cellular link to the D2D link or from the D2D link to the cellular link. In the prior art, assuming that the remote UE first communicates with the base station by using the D2D link, the remote UE is switched from the D2D link to the cellular link to communicate with the base station when quality, measured by the remote UE, of the cellular link between the remote UE and the base station is higher than a threshold. In a switching process, the remote UE establishes an RRC connection to the base station, and after establishment of the RRC connection is completed, the remote UE releases the D2D link, and performs communication by using the cellular link. A method in the prior art is based on a case in which the remote UE has two receiving radio-frequency links, in other words, the remote UE may receive data from both the D2D link and the cellular link. However, in an existing scenario, some remote UEs (for example, a wearable device) each have only one receiving radio-frequency link. If the existing path switching method is used, the remote UE fails to receive the data from the D2D link or the cellular link.

SUMMARY

Embodiments of the present invention provide a path switching method and an apparatus, to resolve a problem of switching a communication link in a scenario in which a terminal device has only one receiving radio-frequency link.

A first aspect of the present invention provides a path switching method, including: receiving, by a first terminal device, a first message sent by a base station by using a second terminal device, where the first message includes access information required by the first terminal device to access the base station, or includes the access information and resource information that is allocated by the base station, and the first terminal device communicates with the second terminal device by using a first communication link; and sending, by the first terminal device, a release message of the first communication link to the second terminal device based on the resource information when the first message includes the access information and the resource information that is allocated by the base station, where the release message is used to indicate that the second terminal device releases the first communication link.

Further, the first terminal device releases the first communication link after the first terminal device receives the first message, and establishes a second communication link to the base station based on the access information after releasing the first communication link.

Optionally, before the receiving, by a first terminal device, a first message sent by a base station by using a second terminal device, the method further includes: sending, by the first terminal device, a measurement result of the first communication link to the base station.

Optionally, the method further includes: receiving, by the first terminal device, a configuration message of a second communication link sent by the base station by using the second terminal device, where the configuration message includes time information of the second communication link; measuring, by the first terminal device, quality of the second communication link based on the time information; and sending, by the first terminal device, a measurement result of the second communication link to the base station by using the second terminal device.

Optionally, after the first terminal device establishes a second communication link to the base station, the method further includes: sending, by the first terminal device, a second message to the base station, where the second message is used to notify the base station that the first terminal device is switched from the first communication link to the second communication link.

A second aspect of the present invention provides a path switching method, including: sending, by a base station, a first message to a first terminal device by using a second terminal device, where the first message includes access information required by the first terminal device to access the base station, or includes the access information and resource information that is allocated by the base station, the first terminal device has established a first communication link to the second terminal device, and the resource information is used to indicate that the first terminal device sends a release message of the first communication link to the second terminal device on a resource corresponding to the resource information; and sending, by the base station, the release message of the first communication link to the second terminal device when the first message includes only the access information, where the release message of the first communication link includes an identifier of the first terminal device.

Optionally, before the sending, by a base station, a first message to a first terminal device by using a second terminal device, the method further includes: receiving, by the base station, a measurement result of the first communication link sent by the first terminal device; determining, by the base station based on the measurement result of the first communication link, to measure quality of a second communication link; sending, by the base station, a configuration message of the second communication link to the first terminal device by using the second terminal device, where the configuration message includes time information of the second communication link; sending, by the base station, the time information and the identifier of the first terminal device to the second terminal device; receiving, by the base station, a measurement result of the second communication link sent by the first terminal device by using the second terminal device, where the measurement result of the second communication link is obtained by measuring the second communication link by the first terminal device based on the time information; and determining, by the base station based on the measurement result of the second communication link, to switch the first terminal device from the first communication link to the second communication link.

Optionally, the method further includes: receiving, by the base station, a second message sent by the first terminal device, where the second message is used to notify the base station that the first terminal device is switched from the first communication link to a second communication link.

A third aspect of the present invention provides a path switching method, including: receiving, by a first terminal device, time information of a second communication link sent by a base station by using a second terminal device, where the first terminal device communicates with the second terminal device by using a first communication link; receiving, by the first terminal device, access information that is required by the first terminal device to access the base station and that is sent by the base station by using the second terminal device; and establishing, by the first terminal device, the second communication link to the base station based on the time information and the access information.

Optionally, the method further includes: releasing, by the first terminal device, the first communication link in a process of establishing the second communication link or after establishment of the second communication link is completed.

Optionally, the first terminal device receives the time information before the base station determines to perform switching from the first communication link to the second communication link.

Optionally, the first terminal device receives the access information after the base station determines to perform switching from the first communication link to the second communication link.

Optionally, the method further includes: sending, by the first terminal device, a measurement result of the first communication link to the base station.

Optionally, the method further includes: measuring, by the first terminal device, quality of the second communication link based on the time information; and sending, by the first terminal device, a measurement result of the second communication link to the base station by using the second terminal device.

Optionally, the releasing, by the first terminal device, the first communication link in a process of establishing the second communication link is specifically: releasing, by the first terminal device, the first communication link after establishing downlink synchronization with the base station and before sending a preamble sequence.

Optionally, after the establishing, by the first terminal device, the second communication link to the base station, the method further includes: sending, by the first terminal device, an RRC reconfiguration complete message to the base station, where the RRC reconfiguration complete message is used to notify the base station that the first terminal device is switched from the first communication link to the second communication link.

A fourth aspect of the present invention provides a path switching method, including: sending, by a base station, time information of a second communication link to a first terminal device by using a second terminal device, where the first terminal device has established a first communication link to the second terminal device; sending, by the base station, the time information and an identifier of the first terminal device to the second terminal device; determining, by the base station, to switch the first terminal device from the first communication link to the second communication link; and sending, by the base station to the first terminal device by using the second terminal device, access information that is required by the first terminal device to access the base station.

Optionally, the base station sends link release indication information to the second terminal device in a process of establishing the second communication link or after establishment of the second communication link is completed, where the link release indication information is used to indicate that the second terminal device releases the first communication link, and the link release indication information includes the identifier of the first terminal device.

Optionally, the base station sends, before determining to perform switching from the first communication link to the second communication link, the time information to the first terminal device.

Optionally, the base station sends, after determining to perform switching from the first communication link to the second communication link, the access information to the first terminal device.

Optionally, the link release indication information includes information about a release time of the first communication link. Correspondingly, the method further includes: determining, by the base station, the release time of the first communication link based on resource information that is occupied by a preamble sequence used by the first terminal device to access the base station and that is included in the access information, where the release time of the first communication link is earlier than a sending time of the preamble sequence.

Optionally, before the determining, by the base station, to switch the first terminal device from the first communication link to the second communication link, the method further includes: receiving, by the base station, a measurement result of the first communication link sent by the first terminal device; determining, by the base station based on the measurement result of the first communication link, to send the time information to the first terminal device; and receiving, by the base station, a measurement result of the second communication link that is obtained through measurement performed by the first terminal device based on the time information. Correspondingly, the determining, by the base station, to switch the first terminal device from the first communication link to the second communication link is specifically: determining, by the base station based on the measurement result of the second communication link, to switch the first terminal device from the first communication link to the second communication link.

Optionally, the method further includes: receiving, by the base station, an RRC reconfiguration complete message sent by the first terminal device, where the RRC reconfiguration complete message is used to notify the base station that the first terminal device is switched from the first communication link to the second communication link.

A fifth aspect of the present invention provides a path switching method, including: receiving, by a second terminal device, time information of a second communication link of a first terminal device and an identifier of the first terminal device that are sent by a base station, where the first terminal device has established a first communication link to the second terminal device; and communicating, by the second terminal device, with the first terminal device and the base station based on the time information.

Optionally, the method further includes: receiving, by the second terminal device, link release indication information sent by the base station, where the link release indication information is used to indicate that the second terminal device releases the first communication link, and the link release indication information includes the identifier of the first terminal device.

A sixth aspect of the present invention provides a first terminal device, including: a receiving module, configured to receive a first message sent by a base station by using a second terminal device, where the first message includes access information required by the first terminal device to access the base station, or includes the access information and resource information that is allocated by the base station, and the first terminal device communicates with the second terminal device by using a first communication link; and a sending module, configured to send a release message of the first communication link to the second terminal device based on the resource information when the first message includes the access information and the resource information that is allocated by the base station, where the release message is used to indicate that the second terminal device releases the first communication link.

Optionally, the first terminal device further includes: a processing module, configured to: release the first communication link after the receiving module receives the first message; and establish a second communication link to the base station based on the access information after releasing the first communication link.

Optionally, the sending module is further configured to send a measurement result of the first communication link to the base station.

Optionally, the receiving module is further configured to receive a configuration message of a second communication link sent by the base station by using the second terminal device, where the configuration message includes time information of the second communication link; the processing module is further configured to measure quality of the second communication link based on the time information; and the sending module is configured to send a measurement result of the second communication link to the base station by using the second terminal device.

Optionally, the sending module is further configured to send a second message to the base station, where the second message is used to notify the base station that the first terminal device is switched from the first communication link to a second communication link.

A seventh aspect of the present invention provides a base station, including: a processing module, configured to determine to switch a first terminal device from a first communication link to a second communication link; and a sending module, configured to send a first message to the first terminal device by using a second terminal device, where the first message includes access information required by the first terminal device to access the base station, or includes the access information and resource information that is allocated by the base station, the first terminal device has established the first communication link to the second terminal device, and the resource information is used to indicate that the first terminal device sends a release message of the first communication link to the second terminal device on a resource corresponding to the resource information, where the sending module is further configured to send, by the base station, the release message of the first communication link to the second terminal device when the first message includes only the access information, where the release message of the first communication link includes an identifier of the first terminal device.

Optionally, the base station further includes: a receiving module, configured to receive a measurement result of the first communication link sent by the first terminal device, where the processing module is further configured to determine, based on the measurement result of the first communication link, to measure quality of the second communication link; the sending module is further configured to send a configuration message of the second communication link to the first terminal device by using the second terminal device, where the configuration message includes time information of the second communication link; the sending module is further configured to send the time information and the identifier of the first terminal device to the second terminal device; the receiving module is further configured to receive a measurement result of the second communication link sent by the first terminal device by using the second terminal device, where the measurement result of the second communication link is obtained by measuring the second communication link by the first terminal device based on the time information; and the processing module is specifically configured to determine, based on the measurement result of the second communication link, to switch the first terminal device from the first communication link to the second communication link.

Optionally, the base station further includes: a receiving module, configured to receive a second message sent by the first terminal device, where the second message is used to notify the base station that the first terminal device is switched from the first communication link to the second communication link.

An eighth aspect of the present invention provides a first terminal device, including: a receiving module, configured to receive time information of a second communication link sent by a base station by using a second terminal device, where the first terminal device communicates with the second terminal device by using a first communication link, where the receiving module is further configured to receive access information that is required by the first terminal device to access the base station and that is sent by the base station by using the second terminal device; and a processing module, configured to establish the second communication link to the base station based on the time information and the access information.

Optionally, the processing module is further configured to release the first communication link in a process of establishing the second communication link or after establishment of the second communication link is completed.

Optionally, the receiving module is specifically configured to receive the time information before the base station determines to perform switching from the first communication link to the second communication link.

Optionally, the receiving module is specifically configured to receive the access information after the base station determines to perform switching from the first communication link to the second communication link.

Optionally, the first terminal device further includes: a sending module, configured to send a measurement result of the first communication link to the base station.

Optionally, the processing module is further configured to measure quality of the second communication link based on the time information; and the sending module is further configured to send a measurement result of the second communication link to the base station by using the second terminal device.

Optionally, the processing module is specifically configured to release the first communication link after establishing downlink synchronization with the base station and before sending a preamble sequence.

Optionally, the sending module is further configured to send an RRC reconfiguration complete message to the base station, where the RRC reconfiguration complete message is used to notify the base station that the first terminal device is switched from the first communication link to the second communication link.

A ninth aspect of the present invention provides a base station, including: a sending module, configured to send time information of a second communication link to a first terminal device by using a second terminal device, where the first terminal device has established a first communication link to the second terminal device, where the sending module is further configured to send the time information and an identifier of the first terminal device to the second terminal device; and a processing module, configured to determine to switch the first terminal device from the first communication link to the second communication link, where the sending module is further configured to send, to the first terminal device by using the second terminal device, access information that is required by the first terminal device to access the base station.

Optionally, the sending module is further configured to send link release indication information to the second terminal device in a process of establishing the second communication link or after establishment of the second communication link is completed, where the link release indication information is used to indicate that the second terminal device releases the first communication link, and the link release indication information includes the identifier of the first terminal device.

Optionally, the sending module is specifically configured to send the time information to the first terminal device before the processing module determines to perform switching from the first communication link to the second communication link.

Optionally, the sending module is specifically configured to send the access information to the first terminal device after the processing module determines to perform switching from the first communication link to the second communication link.

Optionally, the link release indication information includes information about a release time of the first communication link. Correspondingly, the processing module is further configured to determine the release time of the first communication link based on resource information that is occupied by a preamble sequence used by the first terminal device to access the base station and that is included in the access information, where the release time of the first communication link is earlier than a sending time of the preamble sequence.

Optionally, the base station further includes: a receiving module, configured to receive a measurement result of the first communication link sent by the first terminal device, where the processing module is further configured to determine, based on the measurement result of the first communication link, to send the time information to the first terminal device; the receiving module is further configured to receive a measurement result of the second communication link that is obtained through measurement performed by the first terminal device based on the time information; and the processing module is specifically configured to determine, based on the measurement result of the second communication link, to switch the first terminal device from the first communication link to the second communication link.

Optionally, the receiving module is further configured to receive an RRC reconfiguration complete message sent by the first terminal device, where the RRC reconfiguration complete message is used to notify the base station that the first terminal device is switched from the first communication link to the second communication link.

A tenth aspect of the present invention provides a second terminal device, including: a receiving module, configured to receive time information of a second communication link of a first terminal device and an identifier of the first terminal device that are sent by a base station, where the first terminal device has established a first communication link to the second terminal device; and a processing module, configured to communicate with the first terminal device and the base station based on the time information.

Optionally, the receiving module is further configured to: receive link release indication information sent by the base station, where the link release indication information is used to indicate that the second terminal device releases the first communication link, and the link release indication information includes the identifier of the first terminal device.

An eleventh aspect of the present invention provides a first terminal device, including: a receiver, configured to receive a first message sent by a base station by using a second terminal device, where the first message includes access information required by the first terminal device to access the base station, or includes the access information and resource information that is allocated by the base station, and the first terminal device communicates with the second terminal device by using a first communication link; and a transmitter, configured to send a release message of the first communication link to the second terminal device based on the resource information when the first message includes the access information and the resource information that is allocated by the base station, where the release message is used to indicate that the second terminal device releases the first communication link.

Optionally, the first terminal device further includes: a processor, configured to release the first communication link after the receiver receives the first message, where the processor is further configured to establish a second communication link to the base station based on the access information after releasing the first communication link.

Optionally, the transmitter is further configured to send a measurement result of the first communication link to the base station.

Optionally, the first terminal device further includes a processor, where the receiver is further configured to receive a configuration message of a second communication link sent by the base station by using the second terminal device, where the configuration message includes time information of the second communication link; the processor is configured to measure quality of the second communication link based on the time information; and the transmitter is further configured to send a measurement result of the second communication link to the base station by using the second terminal device.

Optionally, the transmitter is further configured to send a second message to the base station, where the second message is used to notify the base station that the first terminal device is switched from the first communication link to a second communication link.

A twelfth aspect of the present invention provides a base station, including: a processor, configured to determine to switch a first terminal device from a first communication link to a second communication link; and a transmitter, configured to send a first message to the first terminal device by using a second terminal device, where the first message includes access information required by the first terminal device to access the base station, or includes the access information and resource information that is allocated by the base station, the first terminal device has established the first communication link to the second terminal device, and the resource information is used to indicate that the first terminal device sends a release message of the first communication link to the second terminal device on a resource corresponding to the resource information, where the transmitter is further configured to send the release message of the first communication link to the second terminal device when the first message includes only the access information, where the release message of the first communication link includes an identifier of the first terminal device.

Optionally, the base station further includes: a receiver, configured to receive a measurement result of the first communication link sent by the first terminal device, where the processor is configured to determine, based on the measurement result of the first communication link, to measure quality of the second communication link; the transmitter is further configured to send a configuration message of the second communication link to the first terminal device by using the second terminal device, where the configuration message includes time information of the second communication link; the transmitter is further configured to send the time information and the identifier of the first terminal device to the second terminal device; the receiver is further configured to receive a measurement result of the second communication link sent by using the second terminal device, where the measurement result of the second communication link is obtained by measuring the second communication link by the first terminal device based on the time information; and the processor is specifically configured to determine, based on the measurement result of the second communication link, to switch the first terminal device from the first communication link to the second communication link.

A thirteenth aspect of the present invention provides a first terminal device, including: a receiver, configured to receive time information of a second communication link sent by a base station by using a second terminal device, where the first terminal device communicates with the second terminal device by using a first communication link, where the receiver is further configured to receive access information that is required by the first terminal device to access the base station and that is sent by the base station by using the second terminal device; and a processor, configured to establish the second communication link to the base station based on the time information and the access information.

Optionally, the processor is further configured to release the first communication link in a process of establishing the second communication link or after establishment of the second communication link is completed.

Optionally, the receiver is specifically configured to receive the time information before the base station determines to perform switching from the first communication link to the second communication link.

Optionally, the receiver is specifically configured to receive the access information after the base station determines to perform switching from the first communication link to the second communication link.

Optionally, the processor is further configured to measure quality of the second communication link based on the time information; and the transmitter is further configured to send a measurement result of the second communication link to the base station by using the second terminal device.

Optionally, the processor is further configured to release the first communication link after establishing downlink synchronization with the base station and before sending a preamble sequence.

Optionally, the transmitter is further configured to send an RRC reconfiguration complete message to the base station, where the RRC reconfiguration complete message is used to notify the base station that the first terminal device is switched from the first communication link to the second communication link.

A fourteenth aspect of the present invention provides a base station, including: a transmitter, configured to send time information of a second communication link to a first terminal device by using a second terminal device, where the first terminal device has established a first communication link to the second terminal device, where the transmitter is further configured to send the time information and an identifier of the first terminal device to the second terminal device; and a processor, configured to determine to switch the first terminal device from the first communication link to the second communication link, where the transmitter is further configured to send, to the first terminal device by using the second terminal device, access information that is required by the first terminal device to access the base station.

Optionally, the transmitter is further configured to send link release indication information to the second terminal device in a process of establishing the second communication link or after establishment of the second communication link is completed, where the link release indication information is used to indicate that the second terminal device releases the first communication link, and the link release indication information includes the identifier of the first terminal device.

Optionally, the transmitter is configured to send the time information to the first terminal device before the processor determines to perform switching from the first communication link to the second communication link.

Optionally, the transmitter is configured to send the access information to the first terminal device after the processor determines to perform switching from the first communication link to the second communication link.

Optionally, the link release indication information includes information about a release time of the first communication link. Correspondingly, the processor is further configured to determine the release time of the first communication link based on resource information that is occupied by a preamble sequence used by the first terminal device to access the base station and that is included in the access information, where the release time of the first communication link is earlier than a sending time of the preamble sequence.

Optionally, the receiver is further configured to receive a measurement result of the first communication link sent by the first terminal device; the processor is further configured to determine, based on the measurement result of the first communication link, to send the time information to the first terminal device; the receiver is further configured to receive a measurement result of the second communication link that is obtained through measurement performed by the first terminal device based on the time information; and the processor is specifically configured to determine, based on the measurement result of the second communication link, to switch the first terminal device from the first communication link to the second communication link.

A fifteenth aspect of the present invention provides a second terminal device, including: a receiver, configured to receive time information of a second communication link of a first terminal device and an identifier of the first terminal device that are sent by a base station, where the first terminal device has established a first communication link to the second terminal device; and a processor, configured to communicate with the first terminal device and the base station based on the time information.

Optionally, the receiver is further configured to receive link release indication information sent by the base station, where the link release indication information is used to indicate that the second terminal device releases the first communication link, and the link release indication information includes the identifier of the first terminal device.

Optionally, in the first aspect to the fifth aspect of the present invention, the access information includes one or more of a physical cell identifier, the identifier of the first terminal device, information about a preamble sequence used by the first terminal device to access the base station, and information about a time-frequency resource occupied by the preamble sequence.

Optionally, in the third aspect, the fourth aspect, the eighth aspect, the ninth aspect, the thirteenth aspect, and the fourteenth aspect of the present invention, the time information and the access information are carried in a radio resource control RRC reconfiguration message.

Optionally, in the third aspect, the fourth aspect, the eighth aspect, the ninth aspect, the thirteenth aspect, and the fourteenth aspect of the present invention, the link release indication information is carried in a release message of the first communication link.

The embodiments of the present invention provide a path switching method and an apparatus. The path switching method includes: determining, by a base station, to switch a first terminal device from a first communication link to a second communication link, and sending, to the first terminal device by using a second terminal device, access information required by the first terminal device to access the base station, so that the first terminal device establishes the second communication link to the base station based on the access information. In the method, the second terminal device may release the first communication link before or after the second communication link is established, or may release the first communication link in a process of establishing the second communication link. According to the method, a problem of switching a communication link in a scenario in which the first terminal device has only one receiving radio-frequency link is resolved.

DETAILED DESCRIPTION OF ILLUSTRATIVE EMBODIMENTS

Figure 1:
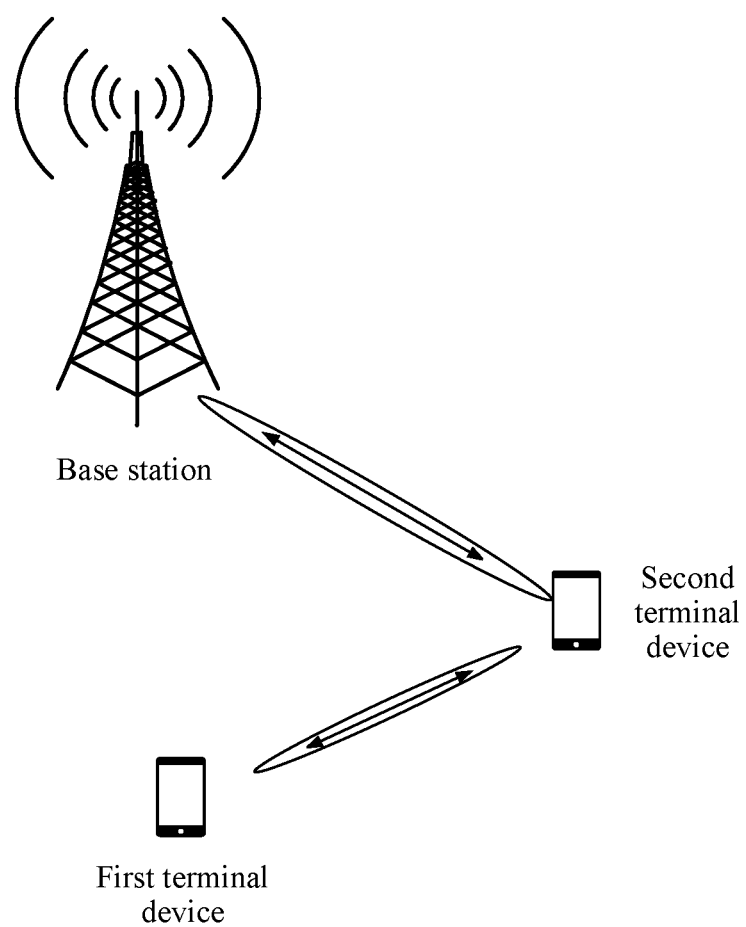
FIG. 1 is a schematic architectural diagram of a network system according to an embodiment of the present invention.

FIG. 1 is a schematic architectural diagram of a network system according to an embodiment of the present invention. As shown in FIG. 1, the network system includes: a base station, a first terminal device, and a second terminal device. The first terminal device may be a wearable device, such as a smart band or a smartwatch. Alternatively, the first terminal device may be a mobile phone, a tablet computer, or the like. The second terminal device may be a mobile phone, a tablet computer, or the like. A first communication link is established between the first terminal device and the second terminal device. A second communication link is established between the second terminal device and the base station. The first terminal device may send data to the base station by using the second terminal device. In other words, the first terminal device first sends the data to the second terminal device by using the first communication link, and then the second terminal device sends the data to the base station by using the second communication link between the second terminal device and the base station. The first terminal device may be remote (remote) UE, the second terminal device may be relay (relay) UE, the first communication link may be a D2D link, and the second communication link may be a cellular link.

Figure 2:
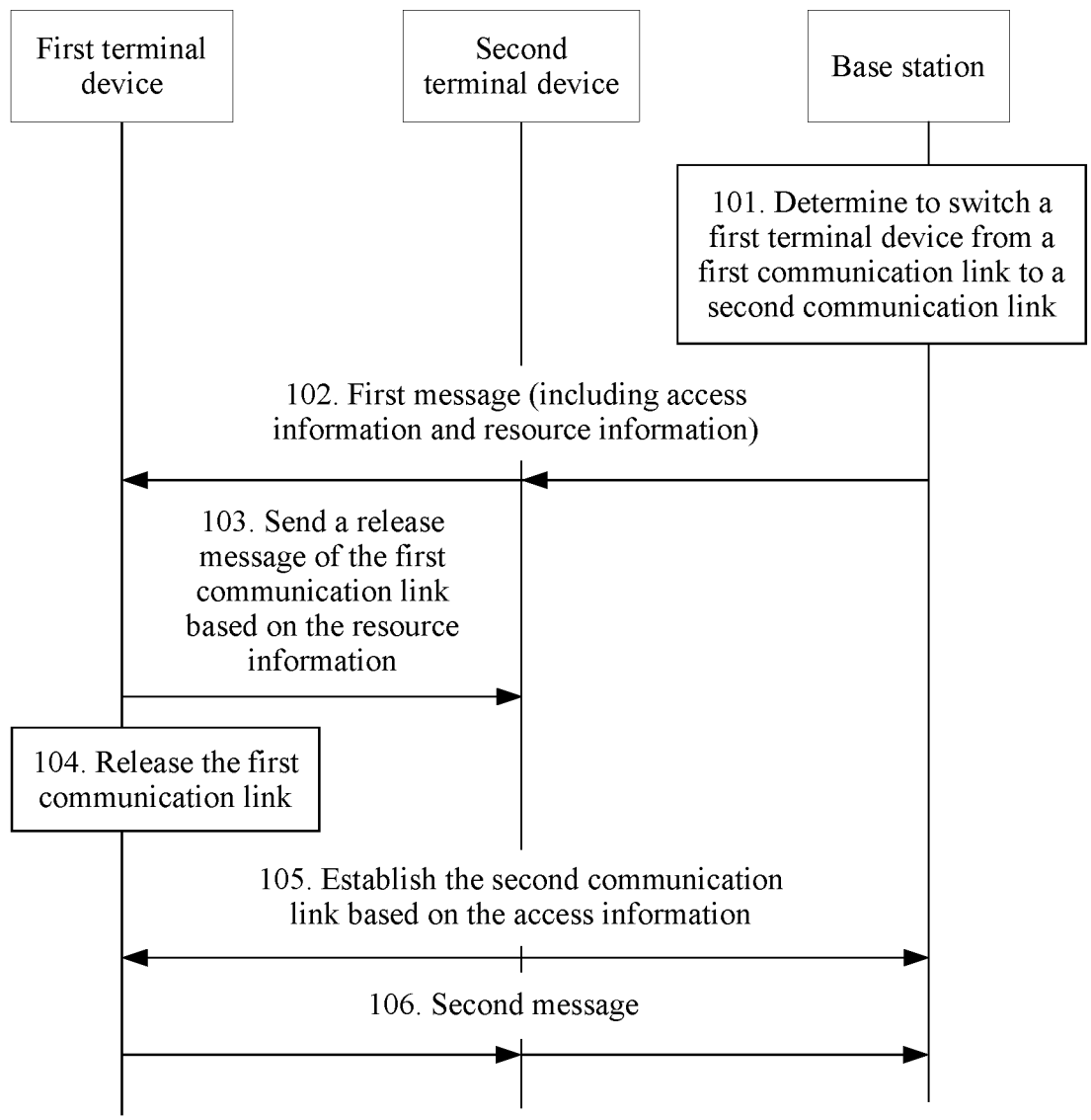
FIG. 2 is a schematic diagram of a signaling flowchart of a path switching method according to Embodiment 1 of the present invention.

FIG. 2 is a schematic diagram of a signaling flowchart of a path switching method according to Embodiment 1 of the present invention. As shown in FIG. 2, the method provided in this embodiment may include the following steps.

Step 101: A base station determines to switch a first terminal device from a first communication link to a second communication link.

The first terminal device has established the first communication link to a second terminal device. In this embodiment, the first terminal device has only one receiving radio-frequency link. Therefore, the first terminal device cannot perform communication by simultaneously using the first communication link and the second communication link. In other words, the first terminal device can receive data only on the first communication link or on the second communication link at a same time.

Optionally, the base station may determine, based on quality of the second communication link, whether to switch the first terminal device from the first communication link to the second communication link. Correspondingly, the base station needs to obtain the quality of the second communication link. Because the first terminal device has only one receiving radio-frequency link, the first terminal device cannot keep measuring the quality of the second communication link while performing communication by using the first communication link. In this embodiment, to enable the first terminal device to measure the quality of the second communication link, the base station configures time information for the first terminal device. The time information is used by the first terminal device to measure the second communication link. The time information may be specifically a communication period and communication duration of the second communication link. For example, the communication period of the second communication link is to seconds, and the communication duration of the second communication link is five seconds. In other words, the first terminal device may perform communication by using the second communication link once every to seconds, the communication time of the second communication link is five seconds, and a communication time of the first communication link is 10 s, so that the first terminal device can also perform, without disconnecting the first communication link, communication by using the communication time of the second communication link configured by the base station.

It should be noted that, that the first terminal device performs communication within the communication time of the second communication link by using the second communication link mentioned in this embodiment and the following embodiments is that the first terminal device measures and/or establishes the second communication link, but the first terminal device cannot send user data to the base station by using the second communication link within the communication time of the second communication link. Optionally, the time information may be alternatively a communication period and communication duration of the first communication link. For example, the communication period of the first communication link is 20 seconds, and the communication duration is to seconds. Correspondingly, a communication period of the second communication link is to seconds, and communication duration is 20 seconds.

The base station may determine, in the following manner, whether to measure the quality of the second communication link: first receiving, by the base station, a measurement result that is of quality of the first communication link and that is sent by the first terminal device by using the second terminal device, and determining, based on the measurement result of the quality of the first communication link, whether to measure the quality of the second communication link. The measurement result of the quality of the first communication link includes reference signal received power (Reference Signal Received Power, RSRP for short) and/or reference signal received quality (Reference Signal Received Quality, RSRQ for short) of the first terminal device on the first communication link.

After determining to measure the quality of the second communication link, the base station configures the time information of the second communication link for the first terminal device, and sends a configuration message of the second communication link to the first terminal device by using the second terminal device. The configuration message includes the time information. The base station further sends the time information and an identifier of the first terminal device to the second terminal device, to keep information synchronization between the second terminal device and the first terminal device. Subsequently, the second terminal device receives, based on the time information, data sent by the first terminal device and data sent by the base station.

The first terminal device receives the configuration message of the second communication link, and measures the second communication link based on the time information. Specifically, the first terminal device receives, within the communication time of the second communication link based on the time information, a measurement reference signal sent by the base station, and obtains a measurement result of the second communication link based on a receiving result of the measurement reference signal. Then the first terminal device sends the measurement result of the second communication link to the base station by using the second terminal device, and the base station receives the measurement result of the second communication link sent by the first terminal device by using the second terminal device. The measurement result of the second communication link includes RSRP and/or RSRQ of the second communication link. The base station determines, based on the measurement result of the second communication link, whether to switch the first terminal device from the first communication link to the second communication link; and when the quality of the second communication link is relatively desirable, determines to perform switching; or when the quality of the second communication link is undesirable, determines not to perform switching. The base station may specifically determine, in the foregoing manner of determining whether to measure the second communication link, whether to perform communication link switching. Details are not described herein again.

Optionally, the base station may further determine, based on the measurement result of the first communication link, whether to switch the first terminal device from the first communication link to the second communication link; and when the quality of the first communication link is relatively desirable, determine to perform switching; or when the quality of the first communication link is undesirable, determine not to perform switching. A specific determining manner may be the foregoing manner of determining whether to measure the second communication link.

Optionally, the base station may further determine, based on load information of one or more of the first terminal device, the second terminal device, and the base station, whether to switch the first terminal device from the first communication link to the second communication link. Alternatively, the base station determines, based on a service requirement of the first terminal device, to switch the first terminal device from the first communication link to the second communication link.

Step 102: The base station sends a first message to the first terminal device by using the second terminal device, where the first message includes access information required by the first terminal device to access the base station, or includes the access information required by the first terminal device to access the base station and resource information.

Specifically, the base station sends the first message to the second terminal device by using the second communication link, and the second terminal device forwards the first message to the first terminal device by using the first communication link. The first message may be an RRC reconfiguration message, or the first message is a message newly defined in the present invention.

The access information includes one or more of a physical cell identifier, the identifier of the first terminal device, information about a preamble sequence used by the first terminal device to access the base station, and information about a time-frequency resource occupied by the preamble sequence. The identifier of the first terminal device may be a cell radio network temporary identifier (Cell Radio Network Temporary Identifier, C-RNTI for short) or another identifier. The information about the preamble sequence may be an index value of the preamble sequence, and the information about the time-frequency resource occupied by the preamble sequence may be an index value of the time-frequency resource.

The resource information is used to indicate that the first terminal device sends a release message of the first communication link to the first terminal device on the time-frequency resource corresponding to the resource information. It should be noted that the resource information may be optional. Alternatively, the base station may not allocate, to the first terminal device, the time-frequency resource used to send the release message of the first communication link, but send the release message of the first communication link to the second terminal device after the base station sends the first message to the first terminal device. The release message of the first communication link includes the identifier of the first terminal device.

Step 13: The first terminal device sends the release message of the first communication link to the second terminal device based on the resource information.

The first terminal device sends the release message of the first communication link to the second terminal device by using the time-frequency resource corresponding to the resource information. The release message of the first communication link is used to indicate that the second terminal device releases the first communication link. The release message of the first communication link includes the identifier of the first terminal device. The identifier of the first terminal device is used to indicate that the second terminal device releases a first communication link of specific UE, and the second terminal device releases the first communication link based on the release message of the first communication link.

Step 104: The first terminal device releases the first communication link.

Step 105: The first terminal device establishes the second communication link to the base station based on the access information.

The first terminal device establishes the second communication link to the base station based on the access information after releasing the first communication link. Specifically, the first terminal device first establishes downlink synchronization with the base station, and then establishes uplink synchronization with the base station. After completing uplink synchronization, the first terminal device performs a process of random access to the base station based on the access information, to establish an RRC connection.

Step 106: The first terminal device sends a second message to the base station by using the second communication link.

The second message is used to notify the base station that the first terminal device is switched from the first communication link to the second communication link. When the first message is an RRC reconfiguration message, the second message is an RRC reconfiguration complete message. Step 106 is an optional step.

In this embodiment, the base station determines to switch the first terminal device from the first communication link to the second communication link, and sends, to the first terminal device by using the second terminal device, the access information required by the first terminal device to access the base station, or the access information and the resource information. The first terminal device sends the release message of the first communication link to the second terminal device based on the resource information, or the base station sends the release message of the first communication link to the second terminal device. The first terminal device establishes the second communication link to the base station based on the access information after releasing the first communication link. In the method, establishment of the second communication link is not started until the first communication link is released, so that a problem of switching a communication link in a scenario in which the first terminal device has only one receiving radio-frequency link is resolved, and service continuity in a link switching process can be ensured.

Figure 3:
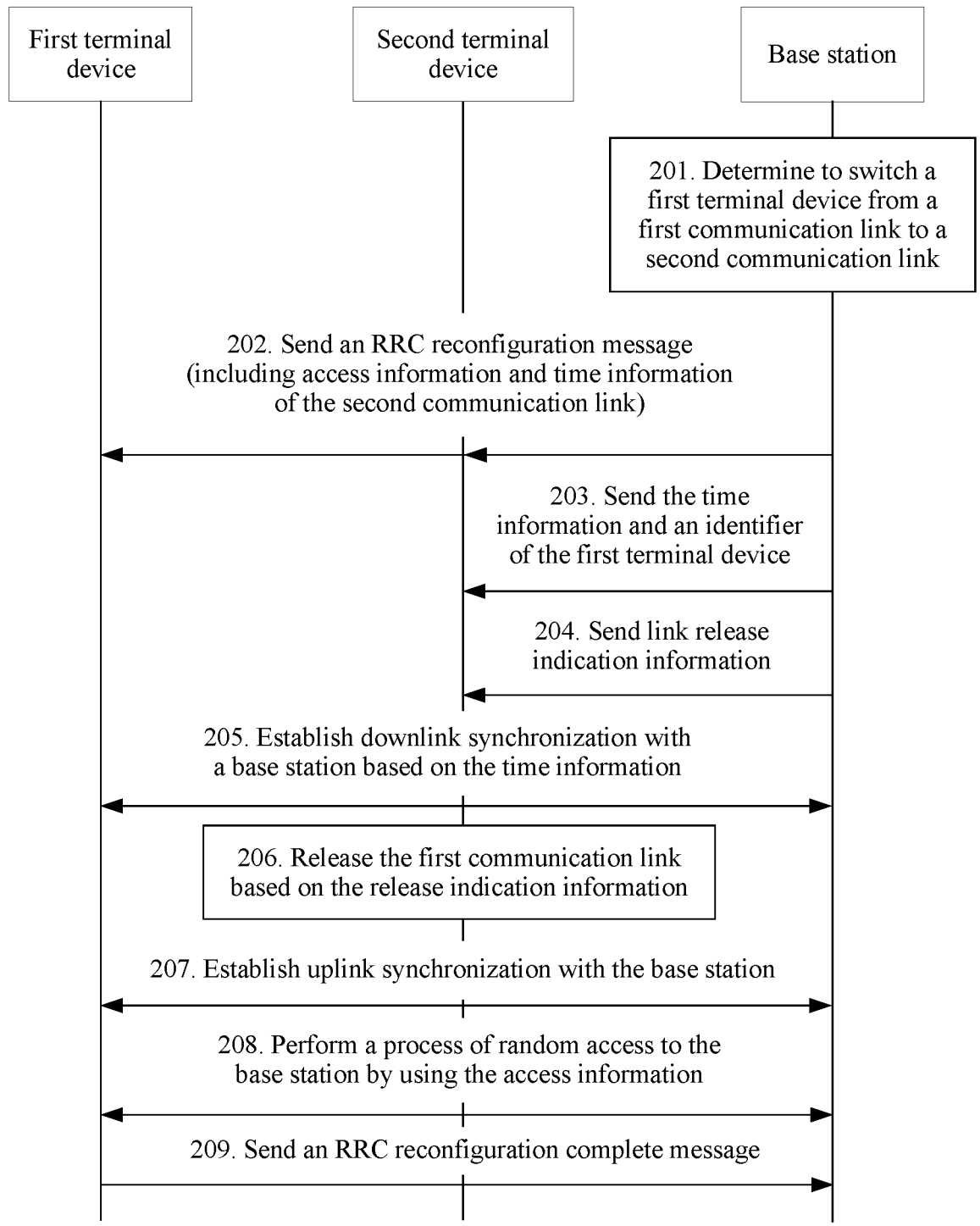
FIG. 3 is a flowchart of a path switching method according to Embodiment 2 of the present invention.

FIG. 3 is a flowchart of a path switching method according to Embodiment 2 of the present invention. In this embodiment, a base station releases a first communication link in a process of establishing a second communication link. As shown in FIG. 3, the method in this embodiment may include the following steps.

Step 201: The base station determines to switch a first terminal device from the first communication link to the second communication link.

For a specific implementation of this step, refer to the related descriptions of step 101 in Embodiment 1.

Step 202: The base station sends an RRC reconfiguration message to the first terminal device by using a second terminal device, where the RRC configuration message includes access information required by the first terminal device to access the base station and time information of the second communication link.

In this embodiment, the base station sends, after determining to perform switching from the first communication link to the second communication link, the access information to the first terminal device, and the access message and the time information of the second communication link are carried in the RRC reconfiguration message. Optionally, the access message and the time information of the second communication link may alternatively be carried in another message, for example, carried in a newly defined message.

Step 203: The base station sends the time information and an identifier of the first terminal device to the second terminal device.

Step 204: The base station sends link release indication information to the second terminal device.

The link release indication message is used to indicate that the second terminal device releases the first communication link, and the link release indication information includes the identifier of the first terminal device. Optionally, the link release indication information is carried in a release message of the first communication link, and the release message of the first communication link further includes the identifier of the first terminal device. Alternatively, the link release indication information is information about a release time of the first communication link, and the second terminal device releases the first communication link based on the information about the release time when the release time expires. Optionally, the information about the release time may be a timer. The first terminal device starts the timer after receiving the timer, and releases the first communication link when the timer times out. Optionally, before the base station sends the information about the release time to the second terminal device, the base station determines the release time of the first communication link based on information about a time-frequency resource that is occupied by a preamble sequence used by UE to access the base station and that is included in the access information. The release time of the first communication link is earlier than a sending time of the preamble sequence. In other words, the second terminal device needs to release the first communication link before the first terminal device sends the preamble sequence.

Step 205: The first terminal device establishes downlink synchronization with the base station based on the time information.

Step 206: The second terminal device releases the first communication link based on the release indication information.

It should be noted that, after receiving the access message, and before releasing the first communication link, the first terminal device sends data to the base station within a communication time of the first communication link based on the time information by using the second terminal device, and establishes downlink synchronization with the base station within a communication time of the second communication link.

Step 207: The first terminal device establishes uplink synchronization with the base station.

Step 208: The first terminal device performs a process of random access to the base station by using the access information.

Step 209: The first terminal device sends an RRC reconfiguration complete message to the base station by using the second communication link.

The RRC reconfiguration complete message is used to notify the base station that the first terminal device is switched from the first communication link to the second communication link. Step 209 is an optional step.

In this embodiment, in a process of determining to switch a communication link of the first terminal device from the first communication link to the second communication link, the base station neither measures quality of the second communication link, nor configures the time information of the second communication link for the first terminal device. Therefore, the base station sends, after determining to perform switching from the first communication link to the second communication link, the time information to the first terminal device, and the base station may add the time information to the RRC reconfiguration message. It should be noted that, in another implementable embodiment of the present invention, in a process of determining to perform switching from the first communication link to the second communication link, the base station may alternatively measure quality of the second communication link and configure the time information of the second communication link for the first terminal device. For example, the base station receives a measurement result of the first communication link sent by the first terminal device by using the second terminal device; and determines, based on the measurement result of the first communication link, whether to measure the quality of the second communication link. After determining to measure the quality of the second communication link, the base station sends the time information of the second communication link to the first terminal device by using the second terminal device. The base station may add the time information of the second communication link to a configuration message of the second communication link. For a specific implementation, refer to the related descriptions of step 101 in Embodiment 1. Details are not described herein again. If the base station sends the time information of the second communication link to the first terminal device in the process of determining to perform switching from the first communication link to the second communication link, the time information of the second communication link does not need to be carried in a subsequent RRC reconfiguration message, and only the access information is carried in the RRC reconfiguration message.

In this embodiment, after determining to switch the communication link of the first terminal device from the first communication link to the second communication link, the base station configures the time information of the second communication link for the first terminal device, so that the first terminal device may also establish the second communication link within the communication time of the second communication link based on the time information before the first communication link is released. In addition, before the first communication link is released, the first terminal device may send data to the base station within the communication time of the first communication link based on the time information by using the second terminal device. In the method, the first communication link is released in the process of establishing the second communication link, so that a problem of switching the communication link in a scenario in which the first terminal device has only one receiving radio-frequency link is resolved, and service continuity in a link switching process can be ensured.

Figure 4:
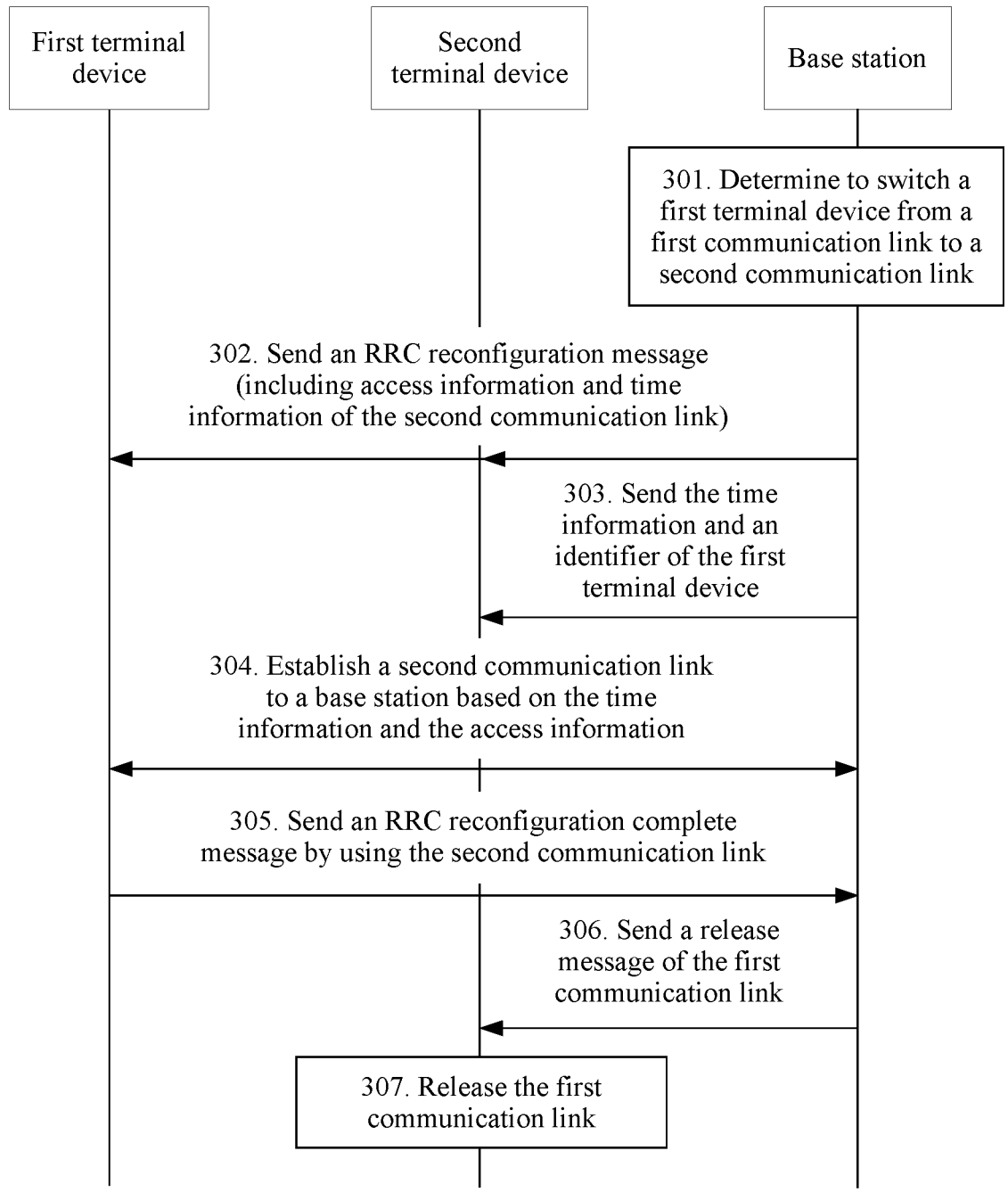
FIG. 4 is a flowchart of a path switching method according to Embodiment 3 of the present invention.

FIG. 4 is a flowchart of a path switching method according to Embodiment 3 of the present invention. In this embodiment, a base station releases a first communication link after establishment of a second communication link is completed. As shown in FIG. 4, the method in this embodiment may include the following steps.

Step 301: The base station determines to switch a first terminal device from the first communication link to the second communication link.

For a specific implementation of this step, refer to the related descriptions of step 101 in Embodiment 1.

Step 302: The base station sends an RRC reconfiguration message to the first terminal device by using a second terminal device, where the RRC configuration message includes access information required by the first terminal device to access the base station and time information of the second communication link.

Step 303: The base station sends the time information and an identifier of the first terminal device to the second terminal device.

Step 304: The first terminal device establishes the second communication link to the base station based on the time information and the access information.

For a process in which the first terminal device establishes the second communication link to the base station based on the access information, refer to the related descriptions of Embodiment 1. Details are not described herein again. It should be noted that, in the process of establishing the second link, the first terminal device sends data to the base station within a communication time of the first communication link based on the time information by using the second terminal device, and directly communicates with the base station within a communication time of the second communication link.

Step 305: The first terminal device sends an RRC reconfiguration complete message to the base station by using the second communication link.

The RRC reconfiguration complete message is used to notify the base station that the first terminal device is switched from the first communication link to the second communication link. Step 305 is an optional step. Alternatively, the base station may consider, by default after a period of time, that the first terminal device is switched to the second communication link.

Step 306: The base station sends a release message of the first communication link to the second terminal device.

The base station sends the release message of the first communication link to the second terminal device after the second link is established. The release message of the first communication link is used to release the first communication link, and the release message of the first communication link includes the identifier of the first terminal device.

In this embodiment, after receiving the access message and before releasing the first communication link, the first terminal device establishes the second communication link to the base station within the communication time of the second communication link based on the time information of the second communication link, and sends data to the base station within the communication time of the first communication link by using the second terminal device.

Step 307: The second terminal device releases the first communication link based on the release message of the first communication link.

In this embodiment, in the process of determining to switch a communication link of the first terminal device from the first communication link to the second communication link, the base station neither measures quality of the second communication link, nor configures the time information of the second communication link for the first terminal device. Therefore, the base station sends, after determining to perform switching from the first communication link to the second communication link, the time information to the first terminal device, and the base station may add the time information to the RRC reconfiguration message. It should be noted that, in another implementable embodiment of the present invention, in a process of determining to perform switching from the first communication link to the second communication link, the base station may alternatively measure quality of the second communication link and configure the time information of the second communication link for the first terminal device. For example, the base station receives a measurement result of the first communication link sent by the first terminal device by using the second terminal device; and determines, based on the measurement result of the first communication link, whether to measure the quality of the second communication link. After determining to measure the quality of the second communication link, the base station sends the time information of the second communication link to the first terminal device by using the second terminal device. The base station may add the time information of the second communication link to a configuration message of the second communication link. For a specific implementation, refer to the related descriptions of step 101 in Embodiment 1. Details are not described herein again. If the base station sends the time information of the second communication link to the first terminal device in the process of determining to perform switching from the first communication link to the second communication link, the time information of the second communication link does not need to be carried in a subsequent RRC reconfiguration message, and only the access information is carried in the RRC reconfiguration message.

In this embodiment, after determining to switch the communication link of the first terminal device from the first communication link to the second communication link, the base station configures the time information of the second communication link for the first terminal device, so that the first terminal device may establish the second communication link within the communication time of the second communication link based on the time information before the first communication link is released, and send data to the base station within the communication time of the first communication link by using the second terminal device. In the method, the first communication link is released after the second communication link is established, so that a problem of switching the communication link in a scenario in which the first terminal device has only one receiving radio-frequency link is resolved, and service continuity in a link switching process can be ensured.

It should be noted that, in this embodiment, after step 303, the base station may further send information about a release time of the first communication link to the second terminal device, and the second terminal device releases the first communication link based on the information about the release time after establishment of the second communication link is completed.

Figure 5:
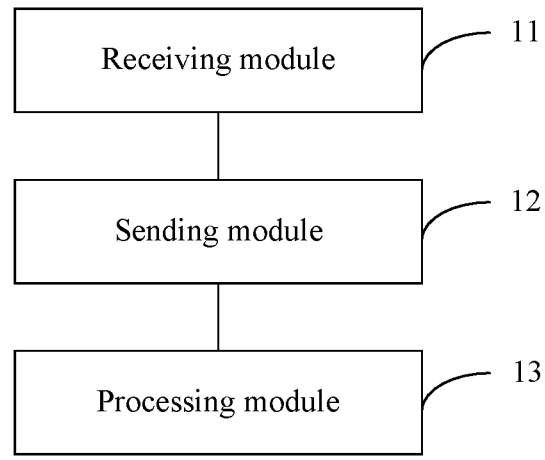
FIG. 5 is a schematic structural diagram of a first terminal device according to Embodiment 4 of the present invention.

FIG. 5 is a schematic structural diagram of a first terminal device according to Embodiment 4 of the present invention. As shown in FIG. 5, the first terminal device in this embodiment includes a receiving module 11, a sending module 12, and a processing module 13.

The receiving module 11 is configured to receive a first message sent by a base station by using a second terminal device, where the first message includes access information required by the first terminal device to access the base station, or includes the access information and resource information that is allocated by the base station, and the first terminal device communicates with the second terminal device by using a first communication link.

The sending module 12 is configured to send a release message of the first communication link to the second terminal device based on the resource information when the first message includes the access information and the resource information that is allocated by the base station, where the release message is used to indicate that the second terminal device releases the first communication link.

The processing module 13 is configured to: release the first communication link after the receiving module 11 receives the first message; and establish a second communication link to the base station based on the access information after releasing the first communication link.

Optionally, the sending module 12 is further configured to send a measurement result of the first communication link to the base station.

Optionally, the receiving module 11 is further configured to receive a configuration message of a second communication link sent by the base station by using the second terminal device, where the configuration message includes time information of the second communication link; the processing module 13 is further configured to measure quality of the second communication link based on the time information; and the sending module 12 is configured to send a measurement result of the second communication link to the base station by using the second terminal device.

Optionally, the sending module 12 is further configured to send a second message to the base station, where the second message is used to notify the base station that the first terminal device is switched from the first communication link to a second communication link.

The first terminal device provided in this embodiment of the present invention can perform the steps of the first terminal device in the foregoing method embodiment. Implementation principles and technical effects thereof are similar. Details are not described herein again.

Figure 6:
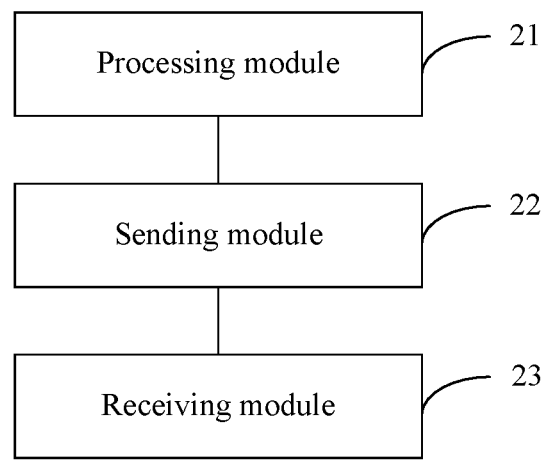
FIG. 6 is a schematic structural diagram of a base station according to Embodiment 5 of the present invention.

FIG. 6 is a schematic structural diagram of a base station according to Embodiment 5 of the present invention. As shown in FIG. 6, the base station in this embodiment includes a processing module 21 and a sending module 22.

The processing module 21 is configured to determine to switch a first terminal device from a first communication link to a second communication link.

The sending module 22 is configured to send a first message to the first terminal device by using a second terminal device, where the first message includes access information required by the first terminal device to access the base station, or includes the access information and resource information that is allocated by the base station, the first terminal device has established the first communication link to the second terminal device, and the resource information is used to indicate that the first terminal device sends a release message of the first communication link to the second terminal device on a resource corresponding to the resource information.

The sending module 22 is further configured to send, by the base station, the release message of the first communication link to the second terminal device when the first message includes only the access information, where the release message of the first communication link includes an identifier of the first terminal device.

Optionally, the base station further includes a receiving module 23.

The receiving module 23 is configured to receive a measurement result of the first communication link sent by the first terminal device.

The processing module 21 is further configured to determine, based on the measurement result of the first communication link, to measure quality of the second communication link.

The sending module 22 is further configured to send a configuration message of the second communication link to the first terminal device by using the second terminal device, where the configuration message includes time information of the second communication link.

The sending module 22 is further configured to send the time information and the identifier of the first terminal device to the second terminal device.

The receiving module 23 is further configured to receive a measurement result of the second communication link sent by the first terminal device by using the second terminal device, where the measurement result of the second communication link is obtained by measuring the second communication link by the first terminal device based on the time information.

The processing module 21 is specifically configured to determine, based on the measurement result of the second communication link, to switch the first terminal device from the first communication link to the second communication link.

Optionally, the receiving module 23 is further configured to receive a second message sent by the first terminal device, where the second message is used to notify the base station that the first terminal device is switched from the first communication link to the second communication link.

The base station provided in this embodiment of the present invention can perform the steps of the base station in the foregoing method embodiment. Implementation principles and technical effects thereof are similar. Details are not described herein again.

Figure 7:
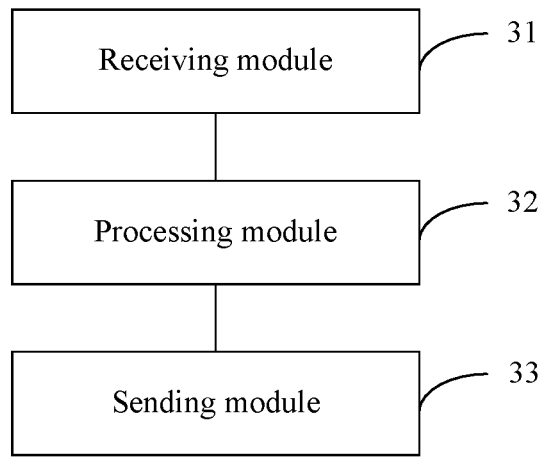
FIG. 7 is a schematic structural diagram of a first terminal device according to Embodiment 6 of the present invention.

FIG. 7 is a schematic structural diagram of a first terminal device according to Embodiment 6 of the present invention. As shown in FIG. 7, the first terminal device in this embodiment includes a receiving module 31 and a processing module 32.

The receiving module 31 is configured to receive time information of a second communication link sent by a base station by using a second terminal device, where the first terminal device communicates with the second terminal device by using a first communication link.

The receiving module 31 is further configured to receive access information that is required by the first terminal device to access the base station and that is sent by the base station by using the second terminal device.

The processing module 32 is configured to establish the second communication link to the base station based on the time information and the access information.

Optionally, the processing module 32 is further configured to release the first communication link in a process of establishing the second communication link or after establishment of the second communication link is completed.

Optionally, the receiving module 31 is specifically configured to receive the time information before the base station determines to perform switching from the first communication link to the second communication link.

Optionally, the receiving module 31 is specifically configured to receive the access information after the base station determines to perform switching from the first communication link to the second communication link.

Optionally, the first terminal device further includes a sending module 33. The sending module 33 is configured to send a measurement result of the first communication link to the base station.

Optionally, the processing module 32 is further configured to measure quality of the second communication link based on the time information. Correspondingly, the sending module 33 is further configured to send a measurement result of the second communication link to the base station by using the second terminal device.

Optionally, the processing module 32 is specifically configured to release the first communication link after establishing downlink synchronization with the base station and before sending a preamble sequence.

Optionally, the sending module 33 is further configured to send an RRC reconfiguration complete message to the base station, where the RRC reconfiguration complete message is used to notify the base station that the first terminal device is switched from the first communication link to the second communication link.

The first terminal device provided in this embodiment of the present invention can perform the steps of the first terminal device in the foregoing method embodiment. Implementation principles and technical effects thereof are similar. Details are not described herein again.

Figure 8:
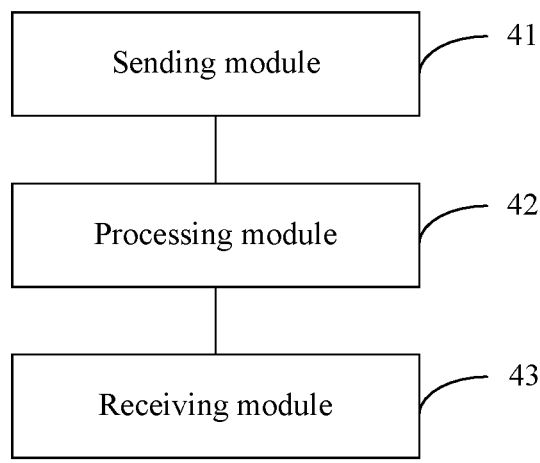
FIG. 8 is a schematic structural diagram of a base station according to Embodiment 7 of the present invention.

FIG. 8 is a schematic structural diagram of a base station according to Embodiment 7 of the present invention. As shown in FIG. 8, the base station in this embodiment includes a sending module 41 and a processing module 42.

The sending module 41 is configured to send time information of a second communication link to a first terminal device by using a second terminal device, where the first terminal device has established a first communication link to the second terminal device.

The sending module 41 is further configured to send the time information and an identifier of the first terminal device to the second terminal device.

The processing module 42 is configured to determine to switch the first terminal device from the first communication link to the second communication link.

The sending module 41 is further configured to send, to the first terminal device by using the second terminal device, access information that is required by the first terminal device to access the base station.

Optionally, the sending module 41 is further configured to send link release indication information to the second terminal device in a process of establishing the second communication link or after establishment of the second communication link is completed, where the link release indication information is used to indicate that the second terminal device releases the first communication link, and the link release indication information includes the identifier of the first terminal device.

Optionally, the sending module 41 is specifically configured to send the time information to the first terminal device before the processing module determines to perform switching from the first communication link to the second communication link.

Optionally, the sending module 41 is specifically configured to send the access information to the first terminal device after the processing module determines to perform switching from the first communication link to the second communication link.

Optionally, the link release indication information includes information about a release time of the first communication link. Correspondingly, the processing module 42 is further configured to determine the release time of the first communication link based on resource information that is occupied by a preamble sequence used by the first terminal device to access the base station and that is included in the access information, where the release time of the first communication link is earlier than a sending time of the preamble sequence.

Optionally, the base station further includes a receiving module 43.

The receiving module 43 is configured to receive a measurement result of the first communication link sent by the first terminal device.

The processing module 42 is further configured to determine, based on the measurement result of the first communication link, to send the time information to the first terminal device.

The receiving module 43 is further configured to receive a measurement result of the second communication link that is obtained through measurement performed by the first terminal device based on the time information.

The processing module 42 is specifically configured to determine, based on the measurement result of the second communication link, to switch the first terminal device from the first communication link to the second communication link.

Optionally, the receiving module 43 is further configured to receive an RRC reconfiguration complete message sent by the first terminal device, where the RRC reconfiguration complete message is used to notify the base station that the first terminal device is switched from the first communication link to the second communication link.

The base station provided in this embodiment of the present invention can perform the steps of the base station in the foregoing method embodiment. Implementation principles and technical effects thereof are similar. Details are not described herein again.

Figure 9:
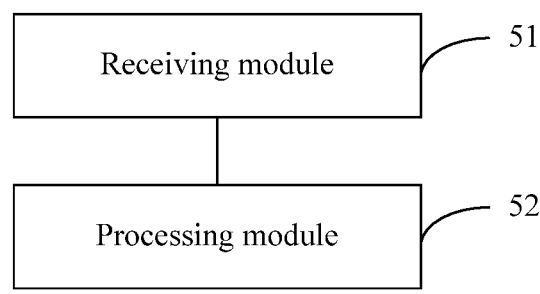
FIG. 9 is a schematic structural diagram of a second terminal device according to Embodiment 8 of the present invention.

FIG. 9 is a schematic structural diagram of a second terminal device according to Embodiment 8 of the present invention. As shown in FIG. 9, the second terminal device in this embodiment includes a receiving module 51 and a processing module 52.

The receiving module 51 is configured to receive time information of a second communication link of a first terminal device and an identifier of the first terminal device that are sent by a base station, where the first terminal device has established a first communication link to the second terminal device.

The processing module 52 is configured to communicate with the first terminal device and the base station based on the time information.

Optionally, the receiving module 51 is further configured to: receive link release indication information sent by the base station, where the link release indication information is used to indicate that the second terminal device releases the first communication link, and the link release indication information includes the identifier of the first terminal device.

The second terminal device provided in this embodiment of the present invention can perform the steps of the second terminal device in the foregoing method embodiment. Implementation principles and technical effects thereof are similar. Details are not described herein again.

Figure 10:
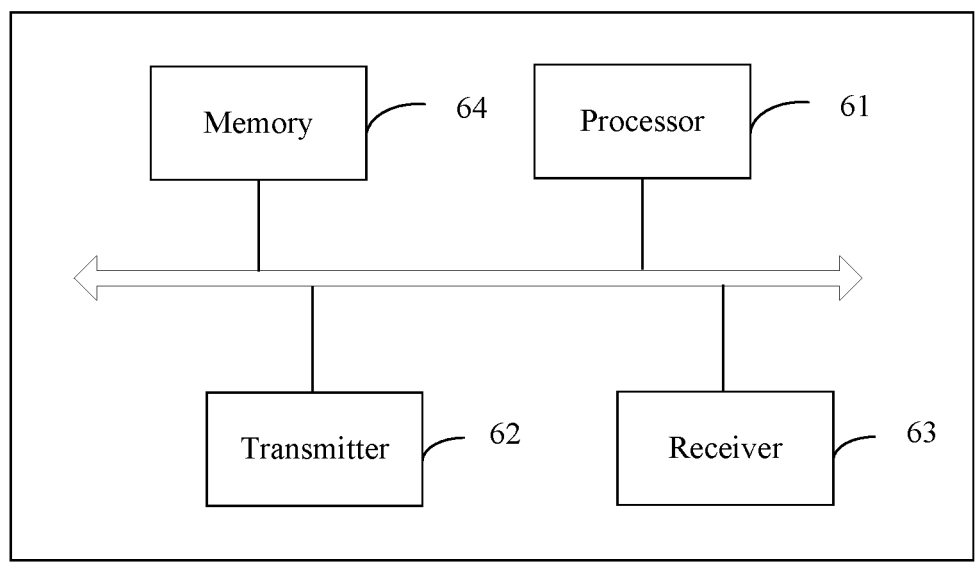
FIG. 10 is a schematic structural diagram of a first terminal device according to Embodiment 9 of the present invention.

FIG. 10 is a schematic structural diagram of a first terminal device according to Embodiment 9 of the present invention. As shown in FIG. to, the first terminal device in this embodiment includes a processor 61, a transmitter 62, a receiver 63, and a memory 64. The transmitter 62, the receiver 63, and the memory 64 are connected to and communicate with the processor 61 by using a bus. The memory 64 is configured to store an instruction. The transmitter 62 and the receiver 63 are configured to communicate with another network device. The processor 61 is configured to execute the instruction stored in the memory 64, so that the first terminal device performs the steps of the first terminal device in the foregoing method embodiment.

Embodiment 10 of the present invention provides a base station. For a structure of the base station, refer to the first terminal device shown in FIG. 10. The base station can be configured to perform the steps of the base station in the foregoing method embodiment.

Embodiment 11 of the present invention provides a second terminal device. For a structure of the second terminal device, refer to the first terminal device shown in FIG. 10. The second terminal device can be configured to perform the steps of the second terminal device in the foregoing method embodiment.

It may be understood that the processor used in the first terminal device, the second terminal device, or the base station in the embodiments of the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware device, or any combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

The bus in the embodiments of the present invention may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, the bus in the accompanying drawings of the present invention is not limited to only one bus or only one type of bus.

In this embodiment of the present invention, the transmitter may correspond to a transmitter in a physical device, and the receiver may correspond to a receiver in a physical device.

In addition, it should be noted that, it should be understood that division of modules in the first terminal device, the second terminal device, or the base station is merely division of logical functions, and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

Some terms in the foregoing embodiments are explained and described below, to help persons skilled in the art understand the embodiments.

The base station in the embodiments of the present invention is a device that connects a terminal to a wireless network, and includes, but is not limited to, an evolved NodeB (evolved NodeB, eNB), a radio network controller (radio network controller, RNC), a NodeB (NodeB, NB), a base station controller (Base Station Controller, BSC), a base transceiver station (Base Transceiver Station, BTS), a home base station (for example, a home evolved NodeB or a home NodeB, HNB), a baseband unit (Baseband Unit, BBU), or the like. In addition, the base station may further include a Wireless Fidelity (Wireless Fidelity, Wi-Fi) access point (Access Point, AP), a base station in a 5G network, or the like. The 5G network is also referred to as a next-generation network, a new radio access technical (New radio access technical, New RAT or NR for short), or the like. The base station in the 5G network is also referred to as an NR node.

The first terminal device and the second terminal device in the embodiments of the present invention may be wireless terminals or wired terminals. A wireless terminal may be a device providing voice and/or other service data connectivity for a user, a handheld device having a wireless connection function, or another processing device connected to a wireless modem. The wireless terminal may communicate with one or more core networks through a radio access network (Radio Access Network, RAN for short). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges data with the radio access network. For example, the wireless terminal may be a device such as a personal communication service (Personal Communication Service, PCS for short) phone, a cordless telephone set, a Session Initiation Protocol (Session Initiation Protocol, SIP for short) phone, a wireless local loop (Wireless Local Loop, WLL for short) station, or a personal digital assistant (Personal Digital Assistant, PDA for short). Alternatively, the wireless terminal may be referred to as a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), or user equipment (User Equipment, UE for short). The present invention is not limited thereto.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A first terminal device, comprising:
    a receiver, configured to receive a first message sent by a base station via a second terminal device, wherein the first terminal device communicates with the base station via the second terminal device, with a first communication link established between the first terminal device and the second terminal device, and wherein the first message comprises access information required by the first terminal device to access the base station and resource information that is allocated by the base station;
    a transmitter, configured to:
        in response to receiving the first message comprising the access information and the resource information, send a release message of the first communication link to the second terminal device based on the resource information, wherein the release message instructs the second terminal device to release the first communication link between the first terminal device and the second terminal device;
    a processor; and
    a non-transitory computer-readable storage medium storing a program to be executed by the processor, the program including instructions for:
        switching, in response to receiving the first message, from communicating with the base station via the second terminal device using the first communication link to communicating with the base station using a second communication link without passing through the second terminal device.

2. The first terminal device according to claim 1, wherein the program includes further instructions for:
    releasing the first communication link in response to receiving the first message; and
    establishing the second communication link between the first terminal device and the base station based on the access information after releasing the first communication link, to communicate with the base station using the second communication link without passing through the second terminal device.

3. The first terminal device according to claim 1,
wherein the transmitter is further configured to send a measurement result of the first communication link to the base station;
wherein the receiver is further configured to receive a configuration message of the second communication link sent by the base station via the second terminal device, wherein the configuration message comprises time information of the second communication link;
wherein the program includes instructions for:
measuring a quality of the second communication link based on the time information; and
wherein the transmitter is further configured to send a measurement result of the second communication link to the base station via the second terminal device.

4. The first terminal device according to claim 1, wherein the access information comprises: a physical cell identifier, an identifier of the first terminal device, information about a preamble sequence used by the first terminal device to access the base station, or information about a time-frequency resource occupied by the preamble sequence.

5. The first terminal device according to claim 1, wherein the transmitter is further configured to send a second message to the base station, wherein the second message notifies the base station that the first terminal device has switched from communicating with the base station via the second terminal device using the first communication link to communicating with the base station without passing through the second terminal device using the second communication link.

6. A first terminal device, comprising:
a processor; and
a non-transitory computer-readable storage medium storing a program to be executed by the processor; and
a receiver, configured to:
receive time information of a second communication link sent by a base station via a second terminal device, wherein the first terminal device communicates with the base station via the second terminal device over a first communication link, with the first communication link established between the first terminal device and the second terminal device; and
receive access information that is required by the first terminal device to access the base station, wherein the access information is sent by the base station via the second terminal device; and
wherein the program includes instructions for switching from communicating with the base station via the second terminal device using the first communication link to communicating with the base station using the second communication link without passing through the second terminal device, the second communication link established between the first terminal device and the base station based on the time information and the access information.

7. The first terminal device according to claim 6, wherein the program further includes instructions for:
releasing the first communication link in a process of the first terminal device establishing the second communication link with the base station or after establishment of the second communication link is completed; or
releasing the first communication link after the first terminal device establishes downlink synchronization with the base station and before the first terminal device sends a preamble sequence.

8. The first terminal device according to claim 6, wherein the time information and the access information are carried in a radio resource control (RRC) reconfiguration message.

9. The first terminal device according to claim 6, wherein the receiver is configured to receive the time information before the base station determines to perform switching from the first communication link to the second communication link.

10. The first terminal device according to claim 6, wherein the receiver is configured to receive the access information after the base station determines to perform switching from the first communication link to the second communication link.

11. The first terminal device according to claim 6, wherein the access information comprises: a physical cell identifier, an identifier of the first terminal device, information about a preamble sequence used by the first terminal device to access the base station, or information about a time-frequency resource occupied by the preamble sequence.

12. The first terminal device according to claim 6, further comprising:
a transmitter;
wherein the program further includes instructions for measuring quality of the second communication link based on the time information; and
wherein the transmitter is configured to send a measurement result of the second communication link to the base station via the second terminal device.

13. The first terminal device according to claim 6, further comprising a transmitter, wherein the transmitter is further configured to send a radio resource control (RRC) reconfiguration complete message to the base station, wherein the RRC reconfiguration complete message notifies the base station that the first terminal device has switched from communicating with the base station via the second terminal device using the first communication link to communicating with the base station without passing through the second terminal device using the second communication link.

14. A base station, comprising:
a processor;
a non-transitory computer-readable storage medium storing a program to be executed by the processor; and
a transmitter, configured to:
send time information of a second communication link to a first terminal device via a second terminal device, wherein the first terminal device is configured to communicate with the base station via the second terminal device over a first communication link with the first communication link established between the first terminal device and the second terminal device; and
send the time information and an identifier of the first terminal device to the second terminal device; and
wherein the program includes instructions for switching the first terminal device to from communicating with the base station via the second terminal device using the first communication link to communicating with the base station using the second communication link without passing through the second terminal device; and
wherein the transmitter is further configured to send, to the first terminal device via the second terminal device, access information that is required by the first terminal device to access the base station.

15. The base station according to claim 14, wherein the transmitter is further configured to:
in a process of establishing the second communication link by the base station with the first terminal device, or after establishment of the second communication link is completed, send a release message of the first communication link to the second terminal device, wherein the release message carries link release indication information, the link release indication information indicates that the second terminal device is releasing the first communication link, the link release indication information comprises the identifier of the first terminal device, and the link release indication information comprises information about a release time of the first communication link.

16. The base station according to claim 15, wherein the program further includes instructions for:
   determining the release time of the first communication link based on resource information, wherein the resource information indicates a resource that is occupied by a preamble sequence used by the first terminal device to access the base station, the resource information is comprised in the access information, and the release time of the first communication link is earlier than a sending time of the preamble sequence.

17. The base station according to claim 14, wherein the time information and the access information are carried in a radio resource control (RRC) reconfiguration message.

18. The base station according to claim 14, wherein the transmitter is configured to send the time information to the first terminal device before the processor determines to perform switching from the first communication link to the second communication link.

19. The base station according to claim 14, wherein the transmitter is configured to send the access information to the first terminal device after the processor determines to perform switching from the first communication link to the second communication link.

20. The base station according to claim 14, further comprising:
   a receiver, configured to receive a measurement result of the first communication link sent by the first terminal device;
   wherein the program further includes instructions for determining, based on the measurement result of the first communication link, to send the time information to the first terminal device;
   wherein the receiver is further configured to receive a measurement result of the second communication link that is obtained through measurement performed by the first terminal device based on the time information; and
   wherein the program further includes instructions for determining, based on the measurement result of the second communication link, to switch the first terminal device from the first communication link to the second communication link.

* * * * *